United States Patent
Storey et al.

(10) Patent No.: US 8,875,384 B2
(45) Date of Patent: Nov. 4, 2014

(54) SYSTEM FOR INSTALLING A SEAL IN A SYNGAS COOLER

(75) Inventors: James Michael Storey, Houston, TX (US); Lien-Yan Chen, Spring, TX (US); Anna Ziombra, Warsaw (PL); Karol Rzepniewski, Warsaw (PL)

(73) Assignee: General Electric Company, Schenectady, NY (US)

( * ) Notice: Subject to any disclaimer, the term of this patent is extended or adjusted under 35 U.S.C. 154(b) by 1252 days.

(21) Appl. No.: 12/480,473

(22) Filed: Jun. 8, 2009

(65) Prior Publication Data

US 2010/0299915 A1  Dec. 2, 2010

(30) Foreign Application Priority Data

May 29, 2009  (PL) .................................. 388150

(51) Int. Cl.
| | | |
|---|---|---|
| *B01J 8/00* | (2006.01) | |
| *C10J 3/86* | (2006.01) | |
| *C10K 1/08* | (2006.01) | |
| *C10K 1/00* | (2006.01) | |

(52) U.S. Cl.
CPC ............ *C10J 3/86* (2013.01); *C10J 2300/1678* (2013.01); *Y02E 20/16* (2013.01); *C10J 2300/165* (2013.01); *C10J 2300/169* (2013.01); *Y02E 20/18* (2013.01); *C10K 1/08* (2013.01); *C10J 2200/09* (2013.01); *C10K 1/003* (2013.01); *C10J 2300/1653* (2013.01)
USPC ............ 29/726; 29/726.5; 277/644; 277/653; 277/654

(58) Field of Classification Search
USPC .......... 29/726, 726.5, 890.032; 277/644, 653, 277/652, 654; 422/129
See application file for complete search history.

(56) References Cited

U.S. PATENT DOCUMENTS

| | | | | |
|---|---|---|---|---|
| 4,959,192 | A * | 9/1990 | Trundle et al. ................ | 376/260 |
| 5,032,054 | A * | 7/1991 | Krajicek et al. ........... | 414/745.3 |
| 5,032,350 | A * | 7/1991 | McDonald et al. ........... | 376/260 |
| 2004/0081599 | A1* | 4/2004 | Rizzi ............................. | 422/221 |
| 2005/0073114 | A1* | 4/2005 | Amos et al. .................... | 277/644 |
| 2009/0038155 | A1 | 2/2009 | Corry | |
| 2009/0041642 | A1 | 2/2009 | Storey et al. | |
| 2009/0130001 | A1 | 5/2009 | Storey et al. | |

* cited by examiner

*Primary Examiner* — Christopher Besler
(74) *Attorney, Agent, or Firm* — Fletcher Yoder, P.C.

(57) ABSTRACT

A system, comprising a seal segment including a cable fastener. The system also includes a syngas cooler component that includes a cable guide, where the cable guide may route a cable coupled to the cable fastener to enable the cable to pull the seal segment into a mounting position.

20 Claims, 8 Drawing Sheets

SYSTEM FOR INSTALLING A SEAL IN A SYNGAS COOLER

CROSS REFERENCE TO RELATED APPLICATION

This application claims priority under 35 U.S.C. §119 to Polish Application Serial No. P-388150, entitled "System for Installing a Seal in a Syngas Cooler", filed on May 29, 2009, which is herein incorporated by reference in its entirety.

BACKGROUND OF THE INVENTION

The subject matter disclosed herein relates to the installation of a seal in a syngas cooler associated with a gasifier.

In general, integrated gasification combined cycle (IGCC) power plants are capable of generating energy from various hydrocarbon feedstock, such as coal, relatively cleanly and efficiently. IGCC technology may convert the hydrocarbon feedstock into a gas mixture of carbon monoxide (CO) and hydrogen ($H_2$), i.e., syngas, by reaction with steam in a gasifier. These gases may be cleaned, processed, and utilized as fuel in a conventional combined cycle power plant. For example, the syngas may be fed into a combustor of a gas turbine of the IGCC power plant and ignited to power the gas turbine for use in the generation of electricity. Coal gasification processes may utilize compressed air or oxygen to react with the coal to form the CO and $H_2$. These processes may generally take place at relatively high pressures and temperatures and may generally be more efficient at design point conditions. Cooling the hot syngas may be beneficial, for example, to aid in maintaining the stability of the syngas during transmission of the syngas from the gasifier to the gas turbine of the IGCC. Additionally, steam may be generated during the cooling process that may then be utilized in conjunction with the steam turbine of the IGCC power plant.

The cooling of the syngas may occur in a radiant syngas cooler. The typical vertical layout of the syngas cooler may allow leakage of the cooled syngas to flow from the bottom of the radiant syngas cooler back to the top, which may cause accelerated corrosion of the radiant syngas cooler. Accordingly, there is a need for a device that may prevent cooled syngas leakage into a radiant syngas cooler, as well as a method of installing such a device.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a seal segment comprising a cable fastener and a syngas cooler component comprising a cable guide, wherein the cable guide is configured to route a cable coupled to the cable fastener to enable the cable to pull the seal segment into a mounting position.

In a second embodiment, a system includes a winch, a cable coupled to the winch, a cable fastener configured to couple the cable to a seal, and a cable guide configured to couple the cable to a syngas cooler component adjacent the seal, wherein the cable guide is configured to route the cable coupled to the cable fastener to enable the cable to pull the seal into a mounting position relative to the syngas cooler component.

In a third embodiment, a system includes a seal segment comprising a cable fastener, a syngas cooler component comprising a cable guide, and a cable connected to the cable fastener and passing through the cable guide to allow for placement of the seal segment into a mounted position in the syngas cooler.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to systems and methods for installing a seal that may act to protect a radiant syngas cooler from exposure to corrosive syngas. The installed seal may provide a pressure relief mechanism to reduce a pressure differential across tubing in the cooler. The seal of the disclosed embodiments may comprise ring segments, which may be assembled together prior to installation in a their final positions. The ring segments may include one or more holder ears that allow for the segments to be attached to cables. The cables may pass through pipes in the syngas cooler to a winch, which may be utilized to hoist the segments into position. The cooler may also include one or more stoppers that may block the segments from being hoisted beyond a certain stopping point. Once positioned, the segments may be affixed to the enclosure of the cooler utilizing bolts or other fasteners, some of which may allow for tightening or loosening to adjust the seal created by the segments.

Figure 1:
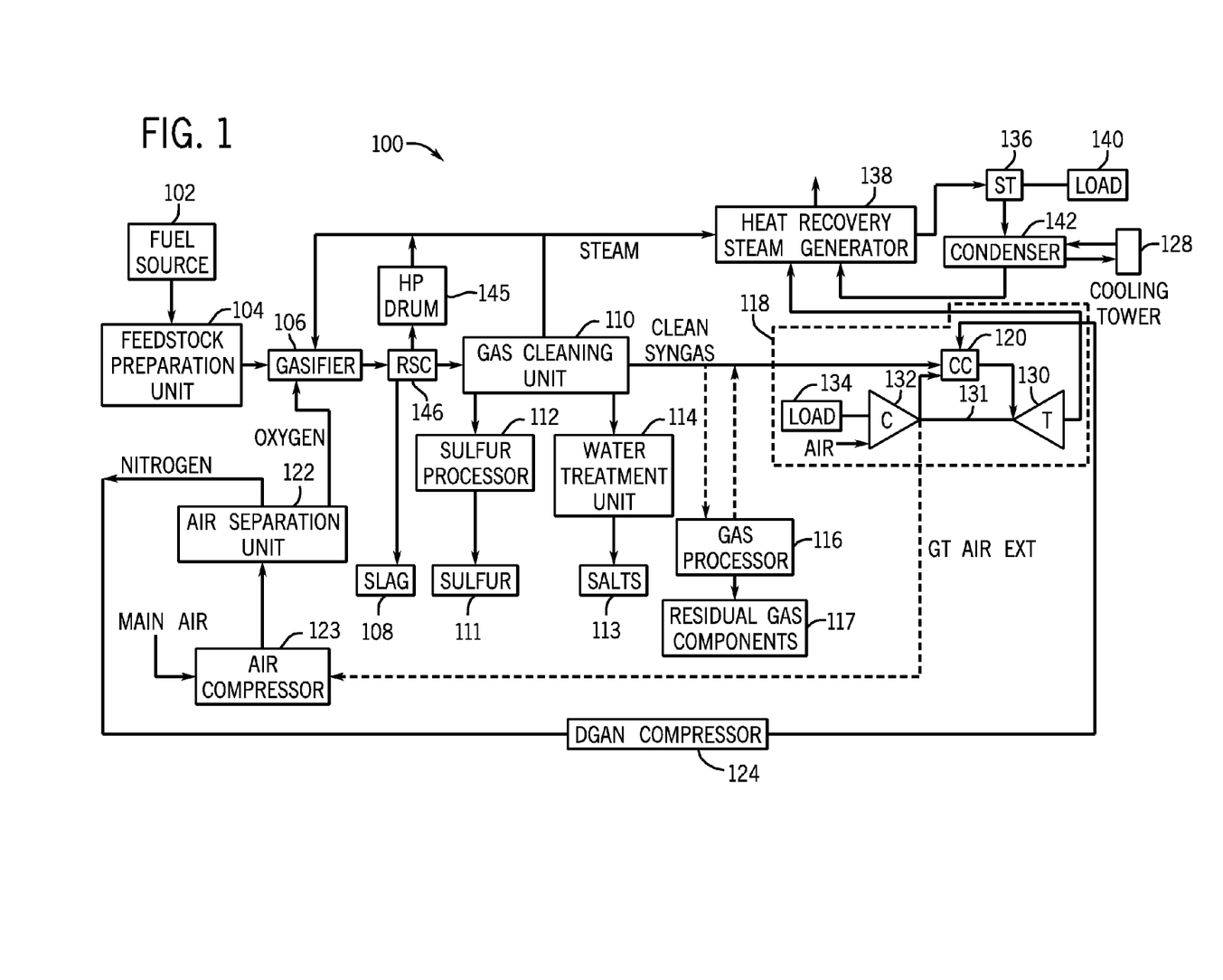
FIG. 1 a schematic block diagram of an embodiment of an integrated gasification combined cycle (IGCC) power plant.

FIG. 1 is a diagram of an embodiment of an integrated gasification combined cycle (IGCC) system 100 that may be powered by synthetic gas, i.e., syngas. Elements of the IGCC system 100 may include a fuel source 102, such as a solid feed, that may be utilized as a source of energy for the IGCC. The fuel source 102 may include coal, petroleum coke, biomass, wood-based materials, agricultural wastes, tars, coke oven gas and asphalt, or other carbon containing items.

The solid fuel of the fuel source 102 may be passed to a feedstock preparation unit 104. The feedstock preparation unit 104 may, for example, resize or reshaped the fuel source 102 by chopping, milling, shredding, pulverizing, briquetting, or palletizing the fuel source 102 to generate feedstock. Additionally, water, or other suitable liquids may be added to the fuel source 102 in the feedstock preparation unit 104 to create slurry feedstock. In other embodiments, no liquid is added to the fuel source, thus yielding dry feedstock.

The feedstock may be passed to a gasifier 106 from the feedstock preparation unit 104. The gasifier 106 may convert the feedstock into a syngas, e.g., a combination of carbon monoxide and hydrogen. This conversion may be accomplished by subjecting the feedstock to a controlled amount of steam and oxygen at elevated pressures, e.g., from approximately 20 bar to 85 bar, and temperatures, e.g., approximately 700 degrees Celsius-1600 degrees Celsius, depending on the type of gasifier 106 utilized. The gasification process may include the feedstock undergoing a pyrolysis process, whereby the feedstock is heated. Temperatures inside the gasifier 106 may range from approximately 150 degrees Celsius to 700 degrees Celsius during the pyrolysis process, depending on the fuel source 102 utilized to generate the feedstock. The heating of the feedstock during the pyrolysis process may generate a solid, (e.g., char), and residue gases, (e.g., carbon monoxide, hydrogen, and nitrogen). The char remaining from the feedstock from the pyrolysis process may only weigh up to approximately 30% of the weight of the original feedstock.

A combustion process may then occur in the gasifier 106. The combustion may include introducing oxygen to the char and residue gases. The char and residue gases may react with the oxygen to form carbon dioxide and carbon monoxide, which provides heat for the subsequent gasification reactions. The temperatures during the combustion process may range from approximately 700 degrees Celsius to 1600 degrees Celsius. Next, steam may be introduced into the gasifier 106 during a gasification step. The char may react with the carbon dioxide and steam to produce carbon monoxide and hydrogen at temperatures ranging from approximately 800 degrees Celsius to 1100 degrees Celsius. In essence, the gasifier utilizes steam and oxygen to allow some of the feedstock to be "burned" to produce carbon monoxide and energy, which drives a second reaction that converts further feedstock to hydrogen and additional carbon dioxide.

In this way, a resultant gas is manufactured by the gasifier 106. This resultant gas may include approximately 85% of carbon monoxide and hydrogen, as well as $CH_4$, HCl, HF, COS, $NH_3$, HCN, and $H_2S$ (based on the sulfur content of the feedstock). This resultant gas may be termed dirty syngas. The gasifier 106 may also generate waste, such as slag 108, which may be a wet ash material. This slag 108 may be removed from the gasifier 106 and disposed of, for example, as road base or as another building material. To clean the dirty syngas, a gas cleaning unit 110 may be utilized. The gas cleaning unit 110 may scrub the dirty syngas to remove the HCl, HF, COS, HCN, and $H_2S$ from the dirty syngas, which may include separation of sulfur 111 in a sulfur processor 112 by, for example, an acid gas removal process in the sulfur processor 112. Furthermore, the gas cleaning unit 110 may separate salts 113 from the dirty syngas via a water treatment unit 114 that may utilize water purification techniques to generate usable salts 113 from the dirty syngas. Subsequently, the gas from the gas cleaning unit 110 may include clean syngas, e.g., $NH_3$ (ammonia) and $CH_4$ (methane).

A gas processor 116 may be utilized to remove residual gas components 117 from the clean syngas such as, ammonia and methane, as well as methanol or any residual chemicals. However, removal of residual gas components 117 from the clean syngas is optional, since the clean syngas may be utilized as a fuel even when containing the residual gas components 117, e.g., tail gas. At this point, the clean syngas may include approximately 3% CO, approximately 55% $H_2$, and approximately 40% $CO_2$ and is substantially stripped of $H_2S$. This clean syngas may be transmitted to a combustor 120, e.g., a combustion chamber, of a gas turbine engine 118 as combustible fuel.

The IGCC system 100 may further include an air separation unit (ASU) 122. The ASU 122 may operate to separate air into component gases by, for example, distillation techniques. The ASU 122 may separate oxygen from the air supplied to it from a supplemental air compressor 123, and the ASU 122 may transfer the separated oxygen to the gasifier 106. Additionally the ASU 122 may transmit separated nitrogen to a diluent nitrogen (DGAN) compressor 124.

The DGAN compressor 124 may compress the nitrogen received from the ASU 122 at least to pressure levels equal to those in the combustor 120, so as not to interfere with the proper combustion of the syngas. Thus, once the DGAN compressor 124 has adequately compressed the nitrogen to a proper level, the DGAN compressor 124 may transmit the compressed nitrogen to the combustor 120 of the gas turbine engine 118.

As described previously, the compressed nitrogen may be transmitted from the DGAN compressor 124 to the combustor 120 of the gas turbine engine 118. The gas turbine engine 118 may include a turbine 130, a drive shaft 131 and a compressor 132, as well as the combustor 120. The combustor 120 may receive fuel, such as syngas, which may be injected under pressure from fuel nozzles. This fuel may be mixed with compressed air as well as compressed nitrogen from the DGAN compressor 124, and combusted within combustor 120. This combustion may create hot pressurized exhaust gases.

The combustor 120 may direct the exhaust gases towards an exhaust outlet of the turbine 130. As the exhaust gases from the combustor 120 pass through the turbine 130, the exhaust gases may force turbine blades in the turbine 130 to rotate the drive shaft 131 along an axis of the gas turbine engine 118. As illustrated, the drive shaft 131 is connected to various components of the gas turbine engine 118, including the compressor 132.

The drive shaft 131 may connect the turbine 130 to the compressor 132 to form a rotor. The compressor 132 may include blades coupled to the drive shaft 131. Thus, rotation of turbine blades in the turbine 130 may cause the drive shaft 131 connecting the turbine 130 to the compressor 132 to rotate blades within the compressor 132. This rotation of blades in the compressor 132 causes the compressor 132 to compress air received via an air intake in the compressor 132. The compressed air may then be fed to the combustor 120 and mixed with fuel and compressed nitrogen to allow for higher efficiency combustion. Drive shaft 131 may also be connected to load 134, which may be a stationary load, such as an electrical generator for producing electrical power, for example, in a power plant. Indeed, load 134 may be any suitable device that is powered by the rotational output of the gas turbine engine 118.

The IGCC system 100 also may include a steam turbine engine 136 and a heat recovery steam generation (HRSG) system 138. The steam turbine engine 136 may drive a second load 140. The second load 140 may also be an electrical generator for generating electrical power. However, both the first and second loads 134, 140 may be other types of loads capable of being driven by the gas turbine engine 118 and steam turbine engine 136. In addition, although the gas turbine engine 118 and steam turbine engine 136 may drive separate loads 134 and 140, as shown in the illustrated embodiment, the gas turbine engine 118 and steam turbine engine 136 may also be utilized in tandem to drive a single load via a single shaft. The specific configuration of the steam turbine engine 136, as well as the gas turbine engine 118, may be implementation-specific and may include any combination of sections.

The system 100 may also include the HRSG 138. Heated exhaust gas from the gas turbine engine 118 may be transported into the HRSG 138 and used to heat water and produce steam used to power the steam turbine engine 136. Exhaust from, for example, a low-pressure section of the steam turbine engine 136 may be directed into a condenser 142. The condenser 142 may utilize a cooling tower 128 to exchange heated water for chilled water. The cooling tower 128 acts to provide cool water to the condenser 142 to aid in condensing the steam transmitted to the condenser 142 from the steam turbine engine 136. Condensate from the condenser 142 may, in turn, be directed into the HRSG 138. Again, exhaust from the gas turbine engine 118 may also be directed into the HRSG 138 to heat the water from the condenser 142 and produce steam.

In combined cycle systems such as IGCC system 100, hot exhaust may flow from the gas turbine engine 118 and pass to the HRSG 138, where it may be used to generate high-pressure, high-temperature steam. The steam produced by the HRSG 138 may then be passed through the steam turbine engine 136 for power generation. In addition, the produced steam may also be supplied to any other processes where steam may be used, such as to the gasifier 106. The gas turbine engine 118 generation cycle is often referred to as the "topping cycle," whereas the steam turbine engine 136 generation cycle is often referred to as the "bottoming cycle." By combining these two cycles as illustrated in FIG. 1, the IGCC system 100 may lead to greater efficiencies in both cycles. In particular, exhaust heat from the topping cycle may be captured and used to generate steam for use in the bottoming cycle.

Figure 2:
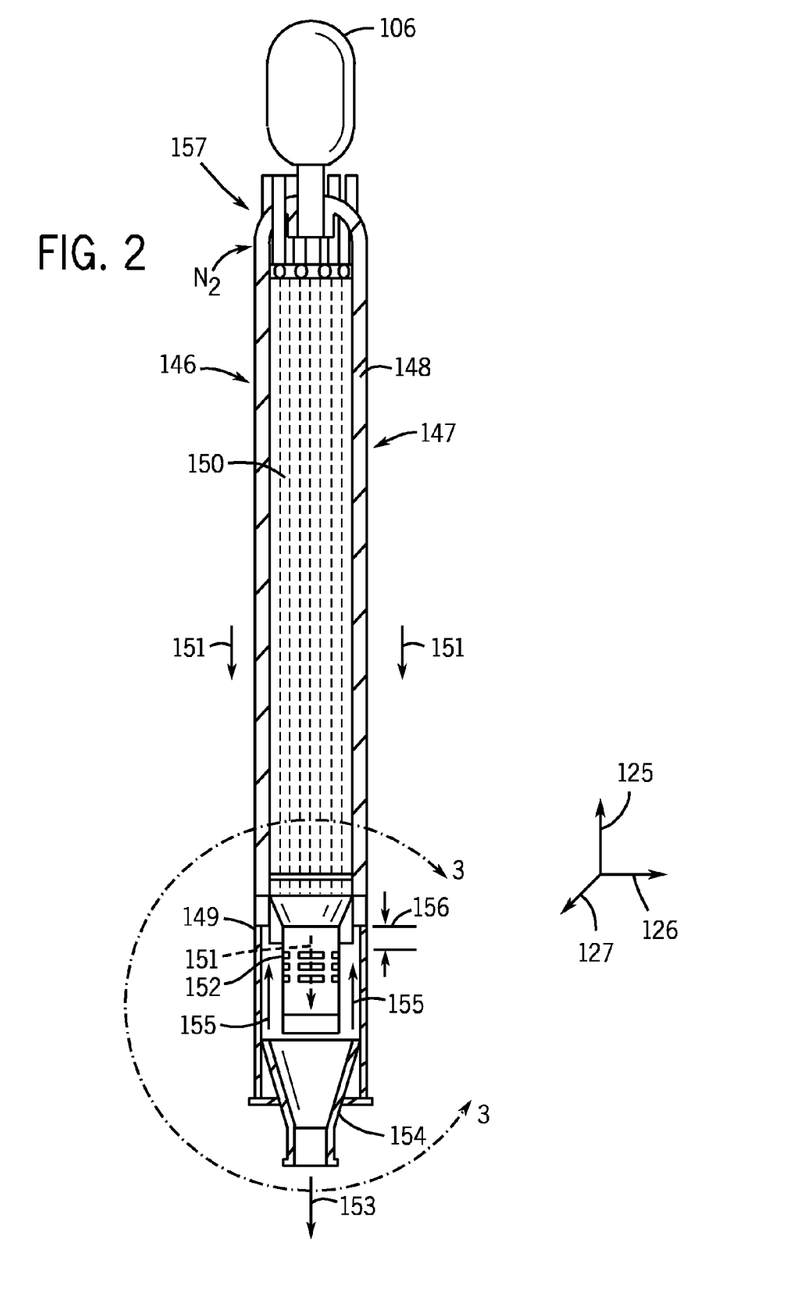
FIG. 2 is a cross-sectional side view of an embodiment of a radiant syngas cooler of FIG. 1.

FIG. 2 is a cross-sectional side view of an embodiment of a radiant syngas cooler (RSC) 146 for use with the IGCC system 100 of FIG. 1. The RSC may have an axial axis 125, a radial axis 126, and a circumferential axis 127. The syngas generated in the gasifier 106 may be mixed with slag, which may be removed prior to transmission of the syngas to the gas turbine engine 118. The RSC 146 may be useful for separating the slag from the syngas. Moreover, it may be beneficial to cool the syngas prior to transmission via the RSC 146. The RSC 146 may include a vessel 148. The vessel 148 may act as an enclosure for the RSC 146, enclosing both an upper region 147 of the RSC 146 as well as a lower region 149 of the RSC 146. The vessel 148 may also house tubing 150, which may be in the upper region 147 of the RSC 146. The tubing 150 may include a plurality of conduits along the radial axis 126 of the RSC 146 and may run parallel in direction with the vessel 148 relative to the axial axis 125. Chilled liquid, such as water, may flow through the tubing 150. Thus, the tubing 150 may act as a heat exchanger within the RSC 146, and may circulate the coolant to an external heat exchanger for removal of heat. The syngas generated in the gasifier 106 may generally flow in a downward manner parallel to the tubing 150 as indicated by arrows 151. In this manner, the syngas may come in contact with the tubing 150 of the RSC 146 and the fluid flowing through the tubing 150 may act to cool the syngas as it travels through the RSC 146. One result of this cooling process may be the generation of steam in the tubing 150, which may then be transmitted to the high pressure drum 145 for collection and transmission th the heat recovery steam generator 138.

Figure 3:
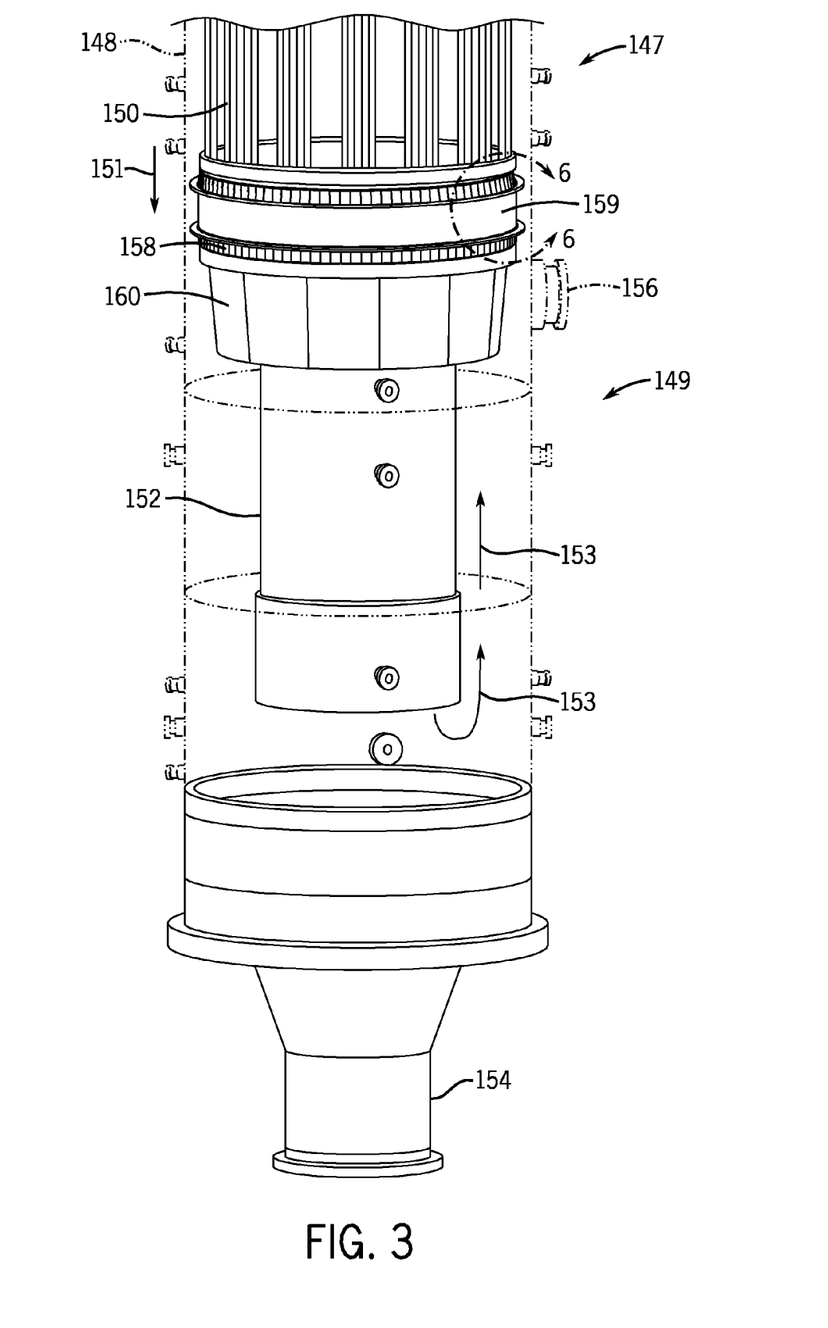
FIG. 3 is a partial cutaway perspective view of the radiant syngas cooler of FIG. 2, illustrating an embodiment of a quench portion as shown within line 3-3 of FIG. 2.

The RSC 146 may also include a conduit 152 in the lower region 149 of the RSC 146 that may aid in directing the cooled syngas and slag out of the RSC 146. For example, as the slag 108 exits the conduit 152, the slag 108 may flow in a generally downward direction 153 to exit the RSC 146 via a quench cone 154. In contrast, the cooled syngas may flow in a general upward direction 155 towards a transfer line 156 as the syngas exits the conduit 152. The transfer line 156 may be used to transmit the syngas to the gas turbine engine 118. The raw syngas may corrode elements of the RSC 146, such as the tubing 150 and/or the inner wall of the vessel 148, if these elements were to come into contact with the syngas. Accordingly, a gas inlet 157 may transmit a non-corrosive fluid, such as a shielding gas (e.g., nitrogen), to the RSC 146. This non-corrosive fluid may flow generally downward between the vessel 148 and the tubing 150 of RSC 146 form a protective barrier, for example, against syngas migration into the annular space between the tubes 150 and the vessel 148. For example, the nitrogen may reside on one side of an annular seal (e.g., 158; FIG. 3), whereas the syngas may reside on the opposite side of the annular seal 158.

FIG. 3 is a partial cutaway perspective view of a quench portion of the RSC 146, illustrating the annular seal 158 between the non-corrosive fluid and the syngas. The annular seal 158 may be positioned between the upper region 147 of the RSC 146, which may include the tubing 150, and the lower region 149 of the RSC 146, which may include the conduit 152. The annular seal 158 may abut an outer support ring 159, which is welded to the vessel 148 above the transfer line 156. Accordingly, the annular seal 158 may be positioned such that it may allow for a controlled leakage of the non-corrosive fluid enveloping the tubing 150 in the annular upper region 147, to the lower, "quench", region 149 of the RSC 146. The annular seal 158 may include a system of curved leaf springs linked together to form a flexible "hula" shape. That is, the annular seal 158 may be termed a hula seal. Thus, as discussed below, the annular seal 158 may function as a check valve to permit one-way flow of the non-corrosive fluid toward the syngas due to a pressure differential (e.g., higher pressure non-corrosive fluid relative to syngas).

The annular seal 158 may typically maintain a pressure difference between the upper region 147 and the lower region 149 of the RSC 146. Additionally, there may be a specific value of pressure difference between the upper region 147 and the lower region 149 of the RSC 146 above which the seal 158 may begin to flatten. This pressure differential may, for example, be approximately 2, 3, 4, 5, or 6 pounds per square inch (psi). Accordingly, if this pressure difference is met, for example, in relation to a decreased amount of syngas in the quench region of the RSC 146, the annular seal 158 may flatten. This may reduce the contact between the seal 158 and, for example, the outer support ring 159, which may allow the non-corrosive fluid to flow into the lower region 149. This downward direction 151 of the flow of the non-corrosive fluid into the lower region 149 may block or shield the syngas from rising into the upper region 147 of the RSC 146. Moreover, the flow of the non-corrosive fluid into the lower region 149 may operate to restore the pressure difference above and below the seal 158 to its previous level, thus causing the seal 158 to expand back into full contact with, for example, the vessel 148. In this manner the pressure difference described above may protect the vessel 148 and tubing 150 from any corrosive effects of the hot syngas. Moreover, the seal 158 may operate as a pressure relief point (e.g., check valve) to maintain pressure balance across the tubing 150, which may aid in maintaining, for example, the structural integrity of the RSC 146.

Figure 4:
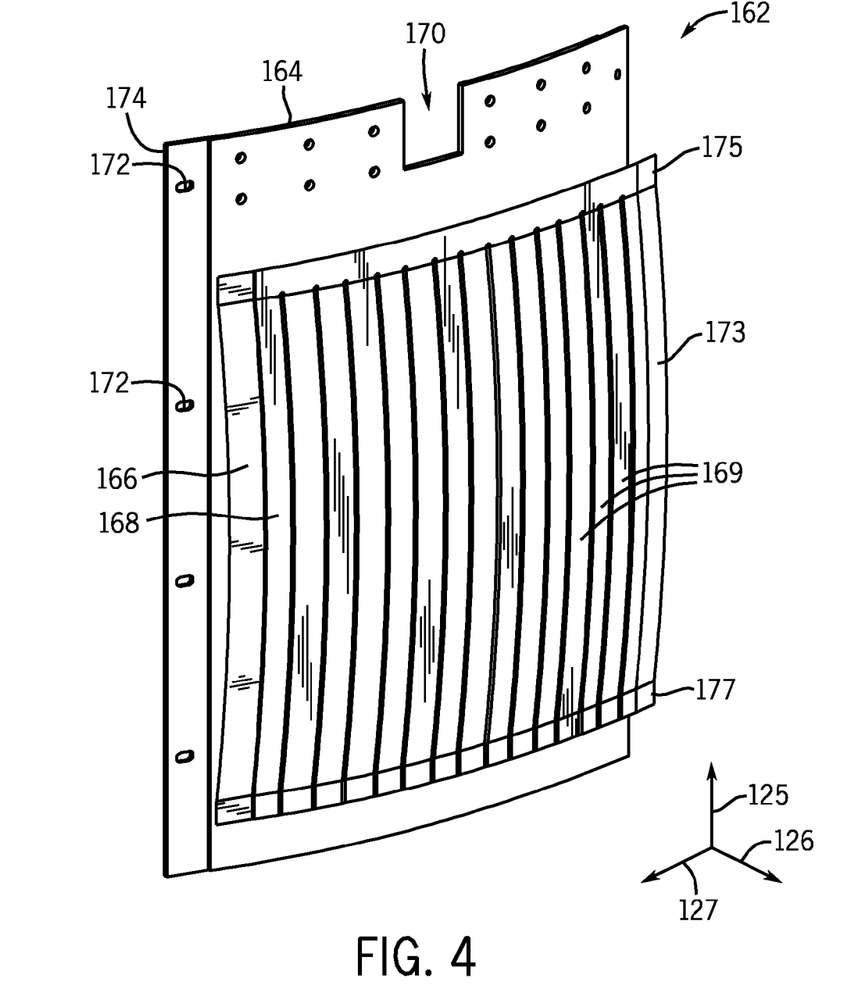
FIG. 4 is a perspective view of an embodiment of a seal segment for use with the radiant syngas cooler of FIG. 2.

FIG. 4 is a partial perspective view of the annular seal 158 of FIG. 3, illustrating an embodiment of a seal segment 162. As discussed below, a plurality of the seal segments 162 may be combined together in an annular arrangement to define the annular seal 158. The seal segment 162 may include, for example, an inner support ring 164, an inner seal 166, (e.g., an inner layer of the seal), and an outer seal 168, (e.g. an outer layer of the seal) that may be placed in a staggered position relative to one another. The inner support ring 164 may include an aperture 170, (e.g., a slot), that may be utilized to mesh with a stopper of the RSC 146 to insure proper placement of the seal segment 162 during installation. The inner support ring 164 may further include one or more openings 172 along an edge 174 of the inner support ring 164. These openings 172 may allow for the alignment of the seal segment 162 with another seal segment 162. For example, one or more fasteners, such as bolts, screws, pins, nails, tacks, and so forth, may be utilized to connect two seal segments 162 via the openings 172.

The inner seal 166 and the outer seal 168 may be welded or otherwise affixed along the top end 175 of the inner seal 166 and the outer seal 168 to the inner support ring 164. Accordingly the inner seal 166 and the outer seal 168 may be affixed to the inner support ring 164, while allowing for radial 126 movement at the bottom end 177 of the seals 166 and 168. Furthermore, the seals 166 and 168, and thus the vertical strips 169, may be curved such that middle portion 173 of the seals 166 and 168 extend radially 126 outwards past both the top end 175 and the bottom end 177 of the seal 168. This allows the vertical strips 169 to operate as leaf springs, able to compress radially 126 when placed pressure is applied to the vertical strips 169. This configuration may allow for flexibility of, for example, the seals 166 and 168 to allow limited flow of a non-corrosive fluid, such as nitrogen, across the face of the seal 168. It should be noted that the seals 166 and 168 may combine to form a compression type of seal.

Figure 5:
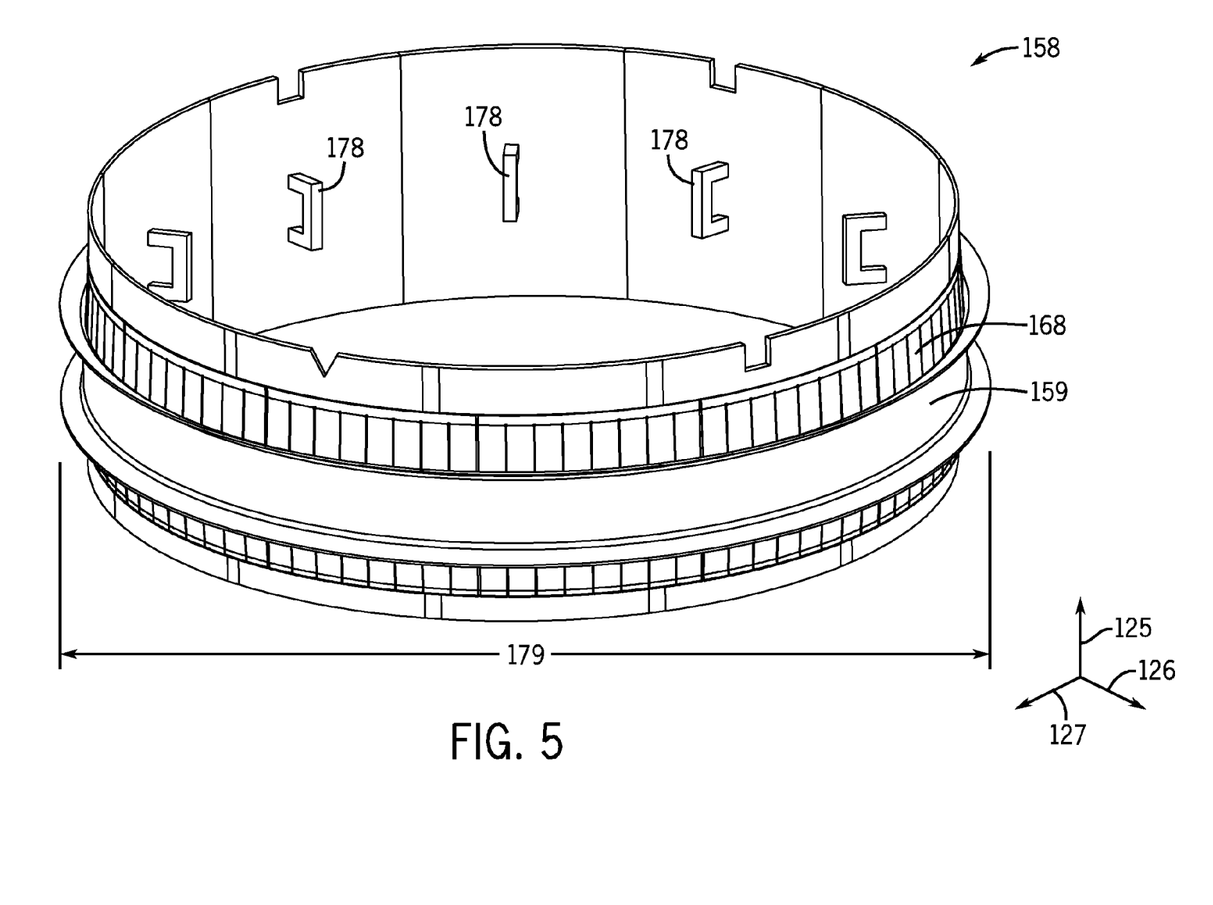
FIG. 5 is a perspective view of an embodiment of an annular seal having multiple seal segments of FIG. 4.

One or more seal segments 162 may be combined to form the annular seal 158, as illustrated in FIG. 5. Each of the seal segments 162 may weigh between approximately 125 and 300 pounds. For example, each seal segment may weigh approximately 200 pounds. Accordingly, the annular seal 158 may include a plurality of the seal segments 162. For example, the annular seal 158 may include between approximately eight and sixteen seal segments 162. By further example, the annular seal 158 may include approximately twelve seal segments 162. The annular seal 158 may also be between approximately 10 and 15 inches in diameter 179. For example, the annular seal 158 may be between approximately 13 and 13.5 feet in diameter. Alternatively, the annular seal 158 may be approximately 13.25 feet in diameter.

In one embodiment, the annular seal 158 may be installed into the RSC 146 in one piece. However, due to the weight of the seal segments 162, it may be advantageous to install the annular seal 158 one seal segment 162 at a time. To assist in this assembly, each seal segment 162 may include an anchor member 178 that may be utilized to hook or otherwise connect a cable, chain, or other support link to the seal segment 162. The anchor member 178 may be a tie-down, a ring, a loop, a hook, or any other apparatus that allows for connection to a cable, chain, or other support link. Also illustrated in FIG. 5 is an outer support ring 159 that may be affixed to the vessel 148. The operation and placement of the outer support ring 159 will be discussed below with respect to FIG. 6. Furthermore, the following FIGS. 6-8 illustrate the annular seal 158 in an installed position, as well as the components that allow for the installation to be completed one seal segment 162 at a time.

Figure 6:
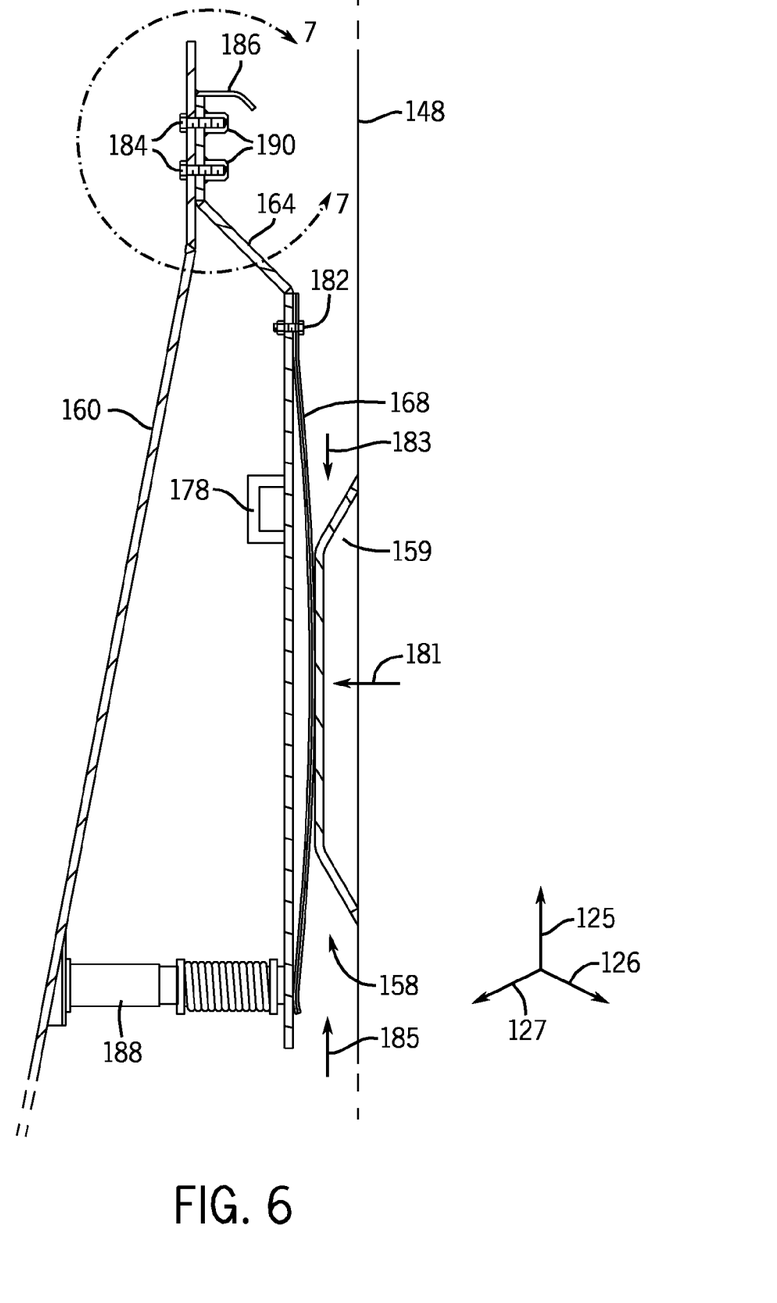
FIG. 6 is a cross-sectional side view of an installed seal segment of FIG. 4 as shown within line 6-6 of FIG. 3.

FIG. 6 illustrates a cross-sectional side view of an installed seal segment of FIG. 4 as shown within line 6-6 of FIG. 3. As can be seen in FIG. 6, a cross-section of seal segment 162 is illustrated. The seal segment 162 as described above may include the inner support ring 164, the outer seal 168, and the anchor member 178. Also illustrated in FIG. 6 is the vessel 148, which may be the outer surface of the RSC 146. Furthermore, the splash plate 160 is illustrated as well as the outer support ring 159. As can be seen in FIG. 6, the seal segment 162, including the outer seal 168, may abut the outer support ring 159. The outer seal 168 and the outer support ring 159 may radially 126 and circumferentially 127 abut one another to form a fluidly tight seal. In this manner, a pressure difference between the upper 147 and lower region 149 of the RSC 146 may be maintained, as described above. That is, outer seal 168 may come in contact with outer support ring 159 to form a fluidly tight seal. However, when pressure is applied via, for example, non-corrosive fluid flowing between vessel 148 and seal segment 162 from RSC 148, the pressure of the non-corrosive fluid may act to cause the outer seal 168 to move radially 126 inward towards the inner support ring 164, as indicated by arrow 181. The movement of the outer seal 168 indicated by arrow 181 may allow the non-corrosive fluid to flow past the seal 158 and the outer support ring 159 and into transfer line 156, as indicated by arrow 183, which may also block the cooled syngas from flowing axially 125 across the face of the outer seal 168 and the outer support ring 159, as indicated by arrow 185. That is, the radiant syngas may be prevented from flowing into the annular space above the seal 158.

As described above, the outer seal 168 and the inner support ring 164 may be affixed to one another. To facilitate this connection, a seal fastener 182 may be utilized. In one embodiment, the seal fastener 182 may be a bolt. Furthermore, more than one seal fastener 182 may be utilized to affix the seal 168 to the inner support ring 164. For example, two or more seal fasteners 182 may be disbursed along the top end 175 of the outer seal 168. The seal fasteners 182 may be disbursed at a uniform spacing relative to one another and the outside edges of the seal segment 162. In one embodiment, two seal fasteners 182 may be utilized each at a distance of approximately one third of the total distance from the outside edge of the seal segment 162 and inserted therein. In another embodiment, a first seal fastener 182 may be located at a distance of approximately one quarter of the distance across the seal segment 162, while a second seal fastener 182 may be utilized at a distance of approximately three quarters of the distance across the seal segment 162. In a third embodiment three seal fasteners 182 may be utilized, one at a distance of approximately one quarter of the distance across of the seal segment 162, one seal fastener 182 at a distance of approximately one half of the distance across the seal segment 162, and the third seal fastener 182 at a distance of approximately three quarters of the distance across the seal segment 162. It is further envisioned, that other alignment positions for the one or more seal fasteners 182 may be encompassed in accordance with this disclosure.

The seal segment 162 may be attached to splash plate 160 via one or more segment fasteners 184. These one or more segment fasteners 184 may be for example erection bolts and/or any other type of couplings. The seal segment fasteners 184 may be axially 125 aligned. Furthermore, it is envisioned that only a single seal segment fastener 184 may be utilized. Alternatively, multiple groups of fasteners 184 may be utilized, and various alignment positions for the one or more seal segment fasteners 184 may be encompassed in accordance with this disclosure.

Furthermore, the seal segment 162 may axially 125 abut a stopper 186 of the RSC 146 when fully installed. The stopper 186 may be a metal strip that may be formed approximately perpendicularly to the splash plate 160. The stopper 186 may have a straight portion followed by for example a downwardly curved portion. Alternatively, the stopper 186 may include only a single straight portion extending from the splash plate 160. The radial 126 angle at which the stopper 186 extends from the splash plate 160 may vary, and various circumferential 127 positions for the stopper 186 may be encompassed in accordance with this disclosure. Furthermore, more than one stopper 186 may be utilized. Regardless of the positioning of the stopper 186, the seal segment 162 may axially 125 abut the stopper 186 at the aperture 170 of the seal segment 162 when brought into contact with the stopper 186. In other words, the stopper 186 may extend axially 125 into the aperture 170. In this manner, the stopper 186 may be utilized to prevent both circumferential 127 and axial 125 movement of the seal segment 162. Thus, the stopper 186 may block axial 125 and circumferential 127 movement of the seal segment 162 as well as allow for the proper axial 125 and circumferential 127 alignment of the seal segment 162 during installation. That is, the stopper 186 may provide a stopping point such that the inner support ring 164 may abut the stopper 186, thus allowing the segment fasteners 184 to affix the seal segment 162 to the splash plate 160.

A second device also may be utilized to block movement of, or stabilize, the seal segment 162. FIG. 6 illustrates an adjustable support 188 that may be utilized in maintaining the stability of seal segment 162. The adjustable support 188 may be, for example, an energizing jack 188. That is, the adjustable support 188 may include one or more spring-loaded bolts, which may be tightened or loosened in the radical direction 126 to allow stiffening of the structure of the seal segment 162, so as to adjust the preloaded compression value of the seal 168. The adjustable support 188 may be used singularly, or in other embodiments, more than one adjustable support 188 may be utilized to provide support to the seal segment 162. For example, for each seal segment 162, two adjustable supports 188 may be utilized. In this embodiment, one adjustable support 188 may be located at a distance of approximately one third of the distance across the seal segment 162, while the other adjustable support 188 may be located at a distance of approximately two thirds of the distance across the seal segment 162. In another embodiment, one adjustable support 188 may be located at a distance of approximately one quarter of the distance across the seal segment 162, while the other adjustable support 188 may be located at a distance of approximately three quarters of the distance across the seal segment 162.

In another embodiment, a single adjustable support 188 may be utilized. For example, this adjustable support 188 may be located at a distance of approximately one half of the distance across the seal segment 162 of the annular ring 158. Regardless of the number of adjustable supports 188 utilized, as discussed above, the adjustable supports 188 may allow for tightening or loosening of the radial 126 compression between the outer seal 168 and the outer support ring 159. In turn, the adjustable compression may change the pressure at which the nitrogen overcomes the syngas, and depresses the seal 158 to flow toward the syngas.

Figure 7:
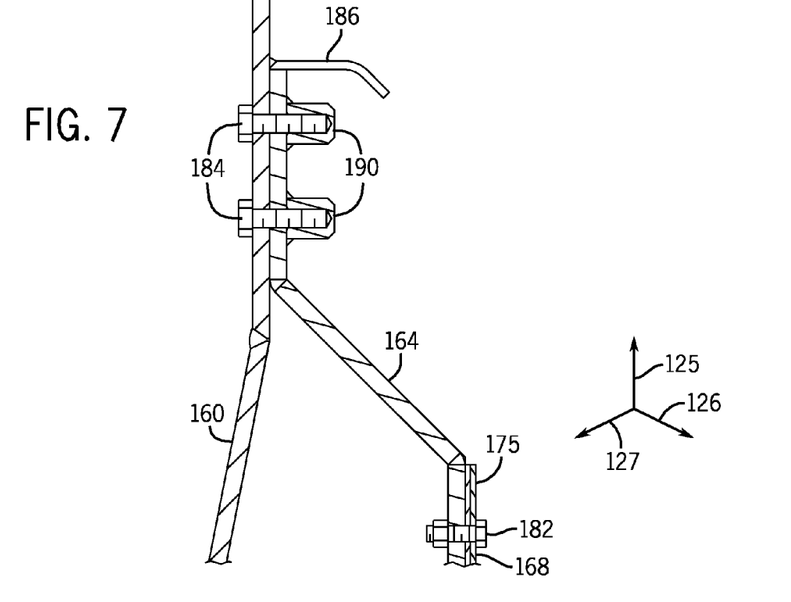
FIG. 7 is a cross-sectional side view of an uppermost portion of the seal segment taken within line 7-7 of FIG. 6.

FIG. 7 is a partial cross-sectional side view of the uppermost portion of the seal segment 162 taken within line 7-7 of FIG. 6. In FIG. 7, the splash plate 160, the inner support ring 164, and the seal attachment surface 166 are all illustrated. Furthermore, the seal fastener 182, as well as the segment fasteners 184 and the stopper 186 are illustrated. The fastener 182 may pass radially through the top end 175 of the outer seal as well as the inner support ring 164 to connect the outer seal 168 and the inner support ring 164. In this manner, the outer seal 168 may be affixed so that the top end 175 of the outer seal 168 remains in one position, thus impeding movement of the top end 175 of the outer seal 168.

Also illustrated in FIG. 7 are the segment fasteners 184. As can be seen from FIG. 7, the fasteners 184 may be driven radially 126 through the splash plate 160 at a distance such that they connect with receptacles 190 in the inner support ring 164. For example, the receptacles 190 may include ridges, threads, or any other surface that may assist in retaining the segment fasteners 184. For example, fastener 184 may be a screw or bolt with threads that rotatably engage threads in the receptacle 190. The receptacle 190 may be any type of aperture that may accept a segment fastener 184.

While the stopper 186 is illustrated as axially 125 abutting the seal segment, in one embodiment, the aperture 170 (see FIG. 4) may instead be included in the seal segment 162 to align with the stopper 186 such that both axial 125 and circumferential 127 movement of the seal segment 162 may be prevented. For example, the seal segment 162 may be raised axially 125 and rotated circumferentially 127 into position until the stopper 186 fits into aperture 170, thus blocking any further movement of the seal segment 162, as well as aligning the positioning of the segment fastener 184 with the aperture 170.

Figure 8:
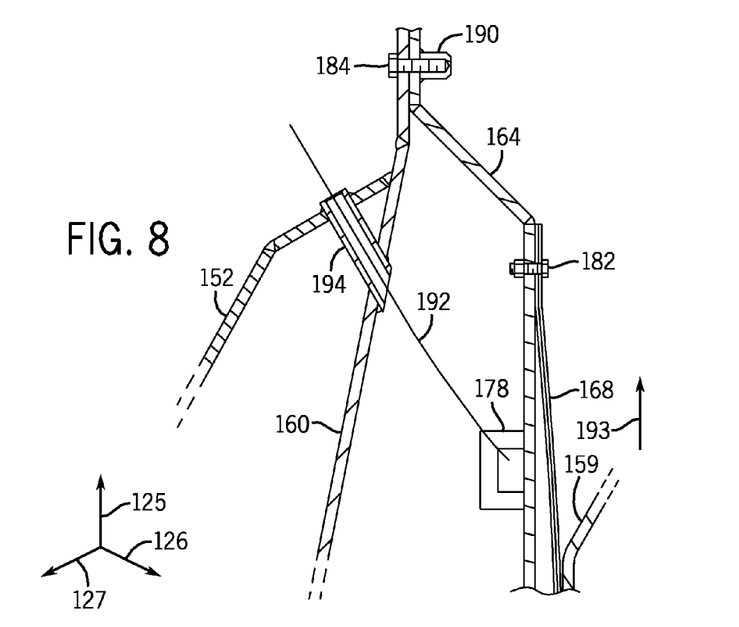
FIG. 8 is a cross-sectional side view of an embodiment of a system for installing one or more seal segments of FIG. 6.

FIG. 8 illustrates a cross-sectional side view of a system for installing one or more seal segments 162. As illustrated, FIG. 8 may include elements previously discussed, such as the splash plate 160, the conduit 152, the inner support ring 164, the outer seal 168, the seal fastener 182, the segment fastener 184, the outer support ring 159, and the anchor member 178. The anchor member 178 may have a cable 192 attached thereto. The cable 192 may pass through a cable guide, such as a pipe 194. The pipe 194 may be affixed to both the splash plate 160 and the conduit 152. The pipe 194 may provide for passage of the cable 192 through the RSC 146. It should be noted that the cable 192, may be comprised of rope, chain, intertwined metal, or any other type of cabling. The cable 192 may be approximately one quarter of an inch in diameter. Furthermore, the diameter of the pipe 194 may be selected such that the cable 192 may pass freely through the pipe 194 without obstruction. The combination of anchor member 178, cable 192, and pipe 194 may allow for installation of the seal segment 162, for example, as follows.

The cable 192 may be attached to a power winch (not shown). The power winch may be activated and may retract the cable 192 into the winching mechanism. As the cable 192 is retracted by the power winch, because it is affixed to the anchor member 178 of seal segment 162, the seal segment 162 may be raised axially 125 upwards, as shown by arrow 193, towards the stopper 186. The cable 192 may also be retracted via the power winch across one or more pulleys that may aid in the retraction of the cable 192. As illustrated in FIG. 8, the pipe 194 may allow this cable 192 to pass through the splash plate 160 and the conduit 152. The seal segment 162 may thus be raised axially 125 until, as described above, the inner support ring 164 contacts the stopper 186. It should be noted that the relative axial 125 positions of the anchor member 178 and the pipe 194 may automatically align with one another (e.g., the axial 125 positions of the anchor member 178 and the pipe 194 are not angularly offset in the circumferential 127 direction), due, for example, to the tension of the cable 192 and weight of the seal segment 162, which align the fasteners 182 and 184 in the appropriate locations for tightening. Alternatively, when an aperture 170 is located in the seal segment 162, the seal segment may be raised axially 125 until aperture 170 contacts the stopper 186, which may align the fasteners 182 and 184 in the appropriate locations for tightening. Regardless of whether the seal portion 162 or the aperture 170 contacts the stopper 186, once contacted, tightening of the fasteners 184 may affix the inner support ring 164 to the splash plate 160. Furthermore, at this time, or previously, tightening the seal fastener 182 may affix the seal 168 to the inner support ring 164.

Once the segment 162 has been attached to the splash plate 160, the cable 192 may be released from the anchor member 178. This may allow the power winch to completely retract the cable 192 from the RSC 146. Once the cable 192 is fully retracted from the RSC 146, the pipe 194 may be plugged via a stopper, or any other device that may be utilized to fluidly seal the pipe 194. In this manner, the pipe 194 may not transmit fluid either into the RSC 146, or from the RSC 146 into the region adjacent to the inner support ring 164. In this manner, a single seal segment 162 may be installed into the RSC 146. It should be noted that this procedure may be repeated for each of a multitude of segments 162. Furthermore, it should be noted that there may be one, two, or more pipes 194 per segment 162. For example, twelve seal segments 162 may be installed in conjunction with twenty four pipes 194, where two pipes 194 are utilized in conjunction with each seal segment. In another embodiment, for example, twelve seal segments 162 may be installed in this manner whereby there may be twelve pipes 194, one for each of the seal segments 162 in the RSC 146. Furthermore, in the embodiment where twelve segments are to be installed into the RSC 146, each pipe 194 may be evenly spaced across the width of the segment 162.

Figure 9:
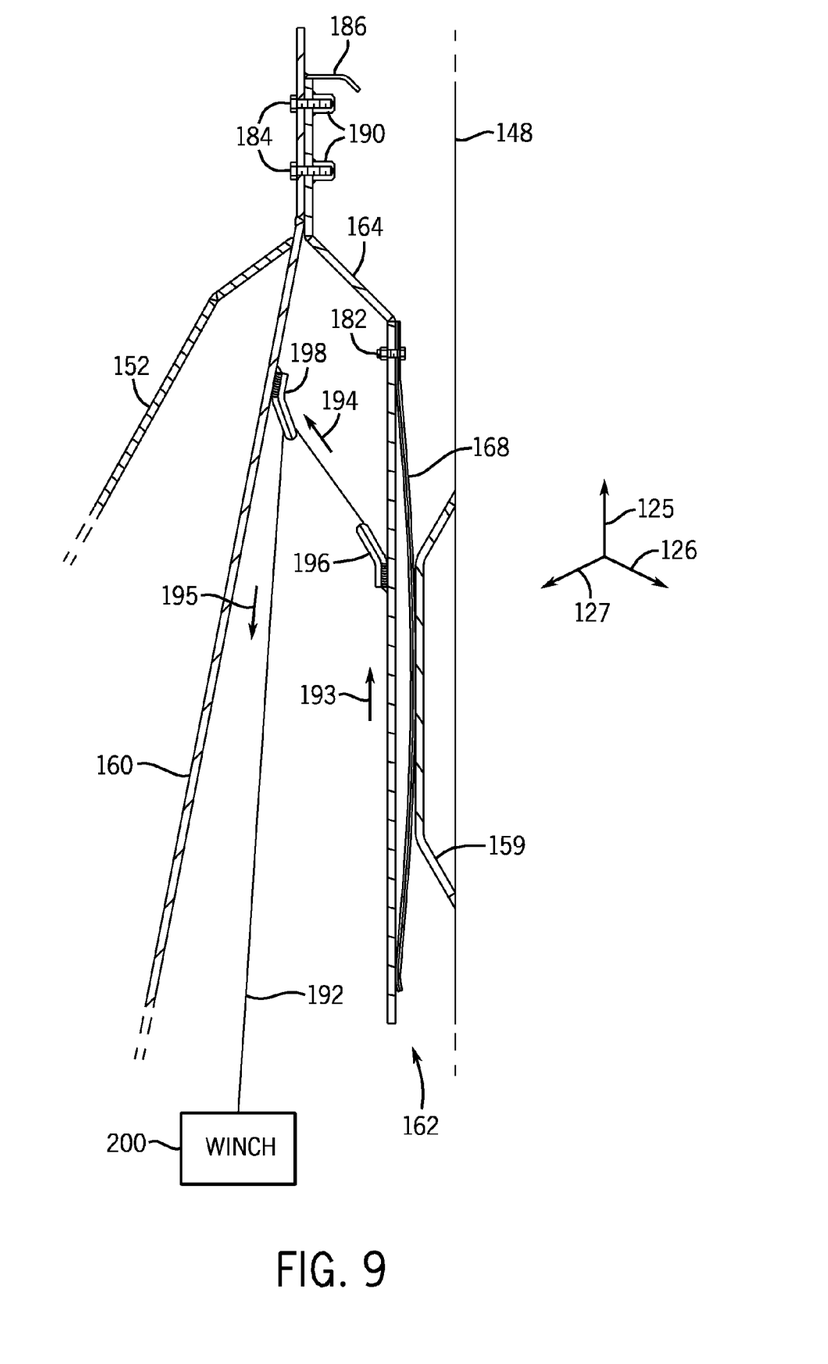
FIG. 9 is a cross-sectional side view of another embodiment of a system for installing one or more seal segments of FIG. 6.

FIG. 9 illustrates a second embodiment of a cross-sectional side view of a system for installing one or more seal segments 162 in the RSC 146. As can be seen in FIG. 9, the seal segment 162 comprises substantively the same elements as illustrated with respect to FIG. 6. However, seal segment 162 of FIG. 9 may include an anchor device 196, and splash plate 160 may include a cable guide, such as an anchored pass-thru 198. The anchor device 196 may function in a manner very similar to anchor member 178 of FIGS. 6 and 8. That is, a cable 192 may be affixed to anchor device 196 and utilized to raise the seal segment 162 into position in the RSC 146. However, in contrast to FIG. 8, the embodiment of FIG. 9 excludes the pipe 194 through the splash plate 160.

Instead, the anchored pass-thru 198 may be utilized on an outer surface of the splash plate 160. The anchored pass-thru 198 may allow cable 192 to pass from the anchor device 196 to the power winch 200. That is the anchored pass-thru 198 may be, for example, a loop, pulley, curved conduit, or other such device that allows for the cable 192 to slide through the anchored pass-thru 198. In operation, the power winch 200 may begin to retract the cable 192. This cable 192, as previously described, may be anchored to anchor device 196. Accordingly, as the cable 192 is retracted by the power winch 200, the seal segment 162 may be moved in an axial upward direction, as indicated by arrow 193. Because the cable 196 moves in an upward direction 194 to anchored pass-thru 198, and then in a downward direction 195 to a power winch 200, the anchored pass-thru 198 may operate as a pulley. That is, cable 192 may contact the anchored pass-thru 198, while providing slidable contact with the cable 192. In this manner, the cable 192 may be affixed to anchored device 196 and may raise the seal segment 162 in response to the cable 192 being pulled through the anchored pass-thru 198 by the power winch 200 until, as described above, the inner support ring 164 contacts the stopper 186.

In the embodiment illustrated in FIG. 9, there is no need for any pipes 194 and/or plugging of the pipes 194 through the splash plate 160. Accordingly, there is a lesser chance of fluid escaping through, for example, the pipe 194. Furthermore, there is no additional need for machining the conduit 152 and the splash plate 160 and to accommodate pipes 194. Additionally, based on ease of placement of the winch 200, (e.g., either axially 125 above the RSC 146 or below the RSC), either the method illustrated in FIG. 8 or FIG. 9 may be chosen. Regardless of the method chosen, as with FIG. 8, FIG. 9 illustrates an apparatus that may be utilized in conjunction with installation of one or more segments 162 of an annular seal 158.

For example, the seal segment 162 may be one of, for example, approximately twelve segments that make up an annular segment 158. Accordingly, the anchor device 196 and anchored pass-thru 198 may be circumferentially 127 aligned with each of the seal segment 162 and the splash plate 160. Additionally, in embodiments where two or more anchor devices 196 may be utilized, a single anchored pass-thru 198 may be used to pass multiple cables 192 to multiple, or a single, power winch 200. Alternatively, multiple anchor pass-thru 198 portions may be utilized in conjunction with multiple anchor devices 196. In this manner, two or more cables 192 may be utilized to raise the seal segment 162 into position. Again, this process may be repeated for multiple seal segments 162 to complete the annular seal 158. Furthermore, as discussed above, once the seal segment of FIG. 9 is positioned via the stopper 186, the segment fasteners 184 may be utilized to keep the inner support ring 164 of seal segment 162 from moving. As this may be repeated for each segment of the annular seal 158, a complete annular seal 158 may be installed.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
a seal segment comprising:
an inner support ring;
a plurality of compressible outer seal elements coupled to the inner support ring, wherein each of the plurality of compressible outer seal elements comprises a spring element;
an inner seal element coupled to the inner support ring and disposed between the inner support ring and the plurality of compressible outer seal elements; and
a cable fastener; and
a syngas cooler component comprising a cable guide, wherein the cable guide is configured to route a cable coupled to the cable fastener to enable the cable to pull the seal segment into a mounting position.

2. The system of claim 1, wherein the cable fastener comprises a cable loop.

3. The system of claim 1, comprising a syngas cooler having the seal segment and the syngas cooler component, wherein the syngas cooler component comprises a splash plate having the cable guide.

4. The system of claim 1, wherein the cable fastener and the cable guide automatically align with one another in a direction of movement toward the mounting position, and the automatic alignment is configured to align mating fasteners configured to secure the seal segment in the mounting position.

5. The system of claim 4, comprising a stopper configured to block the seal segment from moving beyond the mounting position in the direction of movement.

6. The system of claim 5, wherein the seal segment comprises a slot configured to engage the stopper to block rotational movement of the seal segment.

7. A system, comprising:
a winch;
a cable coupled to the winch;
a seal segment comprising a cable fastener configured to couple the cable to the seal segment, wherein the seal segment comprises an inner support ring, a plurality of compressible outer seal elements coupled to the inner support ring, and an inner seal element coupled to the inner support ring and disposed between the inner support ring and the plurality of compressible outer seal elements, wherein each of the plurality of compressible outer seal elements comprises a spring element; and
a cable guide configured to couple the cable to a syngas cooler component adjacent the seal segment, wherein the cable guide is configured to route the cable coupled to the cable fastener to enable the cable to pull the seal segment into a mounting position relative to the syngas cooler component.

8. The system of claim 7, wherein the cable fastener and the cable guide automatically align with one another in a direction of movement toward the mounting position, and the automatic alignment is configured to align mating fasteners configured to secure the seal segment in the mounting position.

9. The system of claim 8, comprising a stopper configured to block the seal segment from moving beyond the mounting position in the direction of movement.

10. The system of claim 9, wherein the cable fastener comprises a cable loop, and the cable guide comprises a passage extending through the syngas cooler component or a pulley disposed on only one side of the syngas cooler component.

11. The system of claim 7, comprising a syngas cooler having the seal segment and the syngas cooler component.

12. A system, comprising:
a seal segment comprising:
an inner support ring;
a plurality of compressible outer seal elements coupled to the inner support ring, wherein each of the plurality of compressible outer seal elements comprises a spring element;
an inner seal element coupled to the inner support ring and disposed between the inner support ring and the plurality of compressible outer seal elements; and
a cable fastener;
a syngas cooler component comprising a cable guide; and
a cable connected to the cable fastener and passing through the cable guide to allow for placement of the seal segment into a mounted position in the syngas cooler component.

13. The system of claim 12, comprising an outer support ring concentrically about the seal segment in the mounted position, wherein the outer support ring abuts the seal segment to form a seal.

14. The system of claim 12, comprising an adjustable support to adjust a preloaded compression value of the seal segment in the mounted position.

15. The system of clam 12, comprising a plurality of seal segments about the circumference of the syngas cooler component, wherein each of the plurality of segments corresponds to an individual cable guide.

16. The system of claim 12, comprising a stopper and a groove in the seal segment, wherein the stopper is configured to align with the groove of the seal segment in the mounted position.

17. The system of claim 12, wherein the cable guide comprises a passage extending through the syngas cooler component or a pulley disposed on one side of the syngas cooler component.

18. The system of claim 1, wherein the seal element comprises a leaf spring.

19. The system of claim 7, wherein the seal element comprises a leaf spring.

20. The system of claim 12, wherein the seal element comprises a leaf spring.

* * * * *